United States Patent [19]

Hall et al.

[11] Patent Number: 4,476,240

[45] Date of Patent: Oct. 9, 1984

[54] CATALYST SYSTEM CONTAINING AN ANIONIC INITIATOR BASED ON LITHIUM AND PHOSPHINE OXIDE MODIFIER

[75] Inventors: James E. Hall, Akron, Ohio; Donald N. Schulz, Annandale, N.J.

[73] Assignee: The Firestone Tire & Rubber Company, Akron, Ohio

[21] Appl. No.: 394,066

[22] Filed: Jul. 1, 1982

[51] Int. Cl.$^3$ .............................................. C08F 4/48
[52] U.S. Cl. ................................... 502/155; 526/179
[58] Field of Search ...................... 252/431 P, 431 N; 526/179; 502/155

[56] References Cited

U.S. PATENT DOCUMENTS 3,699,055  10/1972  Trepka ........................... 252/431 L
4,250,283   2/1981  Caunt ................................. 526/77

Primary Examiner—Christopher A. Henderson
Attorney, Agent, or Firm—Frank J. Troy, Sr.

[57] ABSTRACT

A process and catalyst system is disclosed herein for the preparation of (co)polymers having a 1,2-microstructure of between about 20 and about 65 percent. These (co)polymers are prepared in a hydrocarbon or nonpolar solvent from a monomer system which contains at least one 1,3-diene monomer. The catalyst system which is employed in the production of the (co)polymer is a combination of an anionic initiator based on lithium and a phosphine oxide modifier which is substituted with three saturated heterocyclic rings, each hetero ring containing one nitrogen atom and either four, five or six carbon atoms.

5 Claims, No Drawings

CATALYST SYSTEM CONTAINING AN ANIONIC INITIATOR BASED ON LITHIUM AND PHOSPHINE OXIDE MODIFIER

BACKGROUND OF THE INVENTION

It has previously been disclosed in U.S. Pat. No. 3,207,742, to Van de Castle, that hexamethylphosphoramide (HMPA) can be used in combination with lithium hydrocarbon catalysts to produce polymers from 1,3-dienes having an increased 1,2-microstructure. However HMPA is a suspected carcinogenic and is therefore no longer desirable to be used in catalyst systems.

The present invention has developed a catalyst system employing substituted phosphoramide compounds for increasing 1,2-microstructure in polymers prepared from 1,3-dienes which are not suspected carcinogenic agents and reduce the rate of side reactions which occur during polymerization, thus adding stability to the polymerization reaction.

SUMMARY OF THE INVENTION

A process and catalyst system is disclosed herein for the preparation of (co)polymers containing a 1,2-microstructure of between about twenty (20) and about sixty-five (65) percent. These (co)polymers are prepared in an inert non-polar solvent such as a hydrocarbon solvent from a monomer system which contains at least one 1,3-diene monomer. The catalyst system which is employed in the production of the (co)polymer is a combination of an anionic initiator based on lithium and a phosphine oxide modifier which is substituted with three saturated heterocyclic rings, each hetero ring containing one nitrogen atom and either four, five or six carbon atoms.

DETAILED DESCRIPTION OF THE INVENTION

The process of the present invention for the preparation of medium vinyl polybutadiene or other (co)polymers formed from at least one 1,3-diene monomer employs a novel catalyst system which produces a polymer which has a 1,2-microstructure of between about twenty (20) and about sixty-five (65) percent in the 1,3-diene monomer contributed units.

The polymerization catalyst system which is used in the present invention is a combination of an anionic initiator based on lithium and a phosphine oxide modifier which is tri-substituted with saturated heterocyclic rings containing one nitrogen atom and between four and six carbon atoms, inclusive.

MONOMER SYSTEM

The catalyst system of the present invention is used in preparing (co)polymers having an increased vinyl content from 1,3-diene monomers. Polymerizable 1,3-dienes employed in the production of the polymers of the present invention are 1,3-conjugated dienes containing from four to 12, inclusive, carbon atoms per molecule. Examples thereof include the following: 1,3-butadiene; isoprene; 2,3-dimethyl-1,3-butadiene; 1,3-pentadiene (piperylene); 2-methyl-3-ethyl-1,3-butadiene; 3-methyl-1,3-pentadiene; 1,3-hexadiene; 2-methyl-1,3-hexadiene; 3-butyl-1,3-octadiene, and the like. Among the dialkyl-butadienes, it is preferred that the alkyl groups contain from one to three carbon atoms. Numerous others are disclosed, for instance, in U.S. Pat. No. 3,377,404, the disclosure with respect to which is incorporated herein by reference. The preferred 1,3-diene monomer for use in the present invention is butadiene.

Although butadiene homopolymers or homopolymers prepared from other 1,3-diene monomers are preferred in the practice of this invention, copolymers containing at least one 1,3-diene monomer can be prepared where the comonomers impart desirable properties and do not detract from the polymer properties. Comonomers of different 1,3-diene monomers can be combined in any proportions. When a comonomer system employs a copolymerizable monomer other than a 1,3-diene monomer or monomers, generally at least one percent, preferably at least five percent by weight of the non-1,3-diene monomer should be used and as much as sixty percent, preferably no more than forty percent of the non-1,3-diene monomer may be used. The term (co)polymer is defined herein as either a homopolymer or a copolymer formed from at least one diene monomer and optionally one or more copolymerizable monomers.

In addition to the above described conjugated dienes, one or more polymerizable vinyl-substituted aromatic monomers can be incorporated into the polymerization mixture. Examples of suitable comonomers include, styrene; alpha-methylstyrene; 1-vinylnaphthalene; 2-vinylnaphthalene; 1-alpha-methylvinylnaphthalene; 2-alpha-methylvinylnaphthalene; 1,2-diphenyl-4-methylhexane-1; 1,6-diphenyl-hexadiene-1,5; 1,3-divinylbenzene; 1,3,5-trivinylbenzene; 1,3,5-triisopropenylbenzene; 1,4-divinylbenzene; 1,3-distyrylbenzene; 1,4-distryrylbenzene; 1,2-distyrylbenzene; and mixtures of these, as well as alkyl, cycloalkyl, aryl alkaryl and aralkyl derivatives thereof in which the total number of carbon atoms in the combined hydrocarbon constitutes generally not greater than 12. Examples of these latter compounds include: 3-methylstyrene; 3,5-diethylstyrene; 2-ethyl-4-benzylstyrene; 4-phenylstyrene; 4-p-tolylstyrene; 2,4-divinyltoluene; 4,5-dimethyl-1-vinylnaphthalene; 2,4,6-trivinyltoluene; and 2,4,6-triisopropenyltoluene. Again, reference is made to U.S. Pat. No. 3,377,404 for disclosures of additional vinyl-substituted aromatic compounds which are incorporated herein by reference.

The solvent polymerization takes place in inert organic diluents, in which the monomer, anionic initiator and phosphine oxide modifier are soluble. The anionic initiator may not be soluble in these solvents in some instances. Many suitable inert diluents are known in the art and those diluents generally preferred are alkanes, or other non-polar solvents. Suitable diluents include but are not limited to ethane, propane, iso- and n-butane, iso- and n-pentane, iso- and n-hexane, iso- and n-heptane, iso- and n-octane, cyclobutane, cyclopentane, cyclohexane, cycloheptane, cyclooctane; benzene and toluene. Preferred diluents are iso- and n-butane, iso- and n-pentane, iso- and n-hexane, iso- and n-heptane. The diluents can be employed either alone or in admixture, e.g., as a hydrocarbon distillate fraction.

The concentration of monomer in solvent ranges from 2 to 50 wt. percent or more and is generally dependent upon economics and the ability to control reaction conditions and to handle the polymer solution. The use of monomer concentrations ranging from between 15 to 25 wt. percent is generally practical.

CATALYST SYSTEM

The anionic initiators based on lithium can be selected from any of the known organolithium compounds which are known in the art as being useful in the polymerization of 1,3-diene monomers. Suitable organolithium catalysts have the formula R(Li)$_x$, wherein R represents a hydrocarbyl radical of 1 to 20, preferably 2-8, carbon atoms per R group, and x is an integer of 1-4. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include:

phenyllithium, naphthyllithium, 4-butylphenyllithium, p-tolyllithium, 4-phenylbutyllithium, 4-butylcyclohexyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Other lithium catalysts which can be employed are lithium dialkyl amines, lithium dialkyl phosphines, lithium alkyl aryl phosphines and lithium diaryl phosphines.

Mixtures of different lithium catalysts can also be employed. The preferred lithium catalysts for use in the present invention is n-butyllithium.

The substituted phosphine oxide modifiers which can be employed in the present invention are presented by formula (I):

$$[CH_2(CH_2)_xN]_3-P=O \qquad (I)$$

wherein x represents an integer of 3, 4 or 5.

Specific examples of substituted phosphine oxide catalysts which can be employed in the present invention include most preferably, tripiperidine phosphine oxide, as well as tripyrrolidine phosphine oxide and tri(cyclohexamethylene amine) phosphine oxide. Mixtures of these phosphine oxides can also be employed.

While the anionic initiator and the phosphine oxide modifier can be added as a mixture to the monomer system, it is preferred that they be added sequentially or simultaneously with the addition of the anionic initiator to the monomer system following the addition of the phosphine oxide modifier.

The anionic initiators based on lithium are employed in amounts designed to result in the desired molecular weight. For example, a polybutadiene of 100,000 $\overline{M}n$ would be prepared by charging enough active lithium to react with impurities plus 1.0 mmole of lithium per one-hundred grams of 1,3-butadiene. Polymers of from 1,000 $\overline{M}n$ to 500,000 $\overline{M}n$ can be readily made by one skilled in this technology.

The millimole ratio of the anionic initiator based on lithium to the weight of the monomers which are employed in the preparation of the (co)polymers of the present invention range from about 0.2 mmoles to 10 mmoles, preferably 0.3 mmoles to 1.0 mmoles of anionic initiator based on lithium per hundred grams of monomer.

The level of phosphine oxide modifier in the catalyst system can be employed as a molar ratio of the phosphine oxide modifier to the lithium initiator. Molar ratios of the phosphine oxide modifier to the lithium initiator can vary from 0.05/1.0 to 10.0/1.0, preferably from 0.1/1.0 to 2.0/1.0.

The amount of phosphine oxide modifier as well as the ratio of phosphine oxide modifier to anionic initiator employed in producing the (co)polymers of the present invention determine the content of 1,2-microstructure in the 1,3-diene (co)polymer. It has been determined that the 1,3-diene (co)polymers produced according to the process of this invention should have a vinyl content ranging between about twenty (20) to about sixty-five (65) percent 1,2-microstructure in the 1,3-diene monomer contributed units.

All amounts of phosphine oxide modifiers, as well as amounts of anionic initiator which are disclosed herein as applicable to the present invention are considered to be catalytically effective amounts, that is, effective amounts for initiating and conducting polymerization of the monomer systems disclosed herein.

Process conditions such as the starting temperature of the polymerization reaction and the ratio of monomer to diluent independently effect the final 1,2-microstructure content of the 1,3-diene (co)polymers. These conditions can be controlled for each monomer reaction system to produce the final desired 1,2-microstructure content of from about twenty (20) to about sixty-five (65) percent in the 1,3-diene monomer contributed units. It is desirable to produce polymers and copolymers having a 1,2-microstructure between 35 and 55 percent in the 1,3-diene monomer contributed units.

The term 1,2-microstructure as used in the present invention actually refers to the mode of addition of a growing polymer chain with a conjugated diene monomer unit. Either 1,2-addition or 1,4-addition can occur. In terms of nomenclature this results in 1,2-microstructure for the monomer unit in the polymer chain when 1,3-butadiene is the monomer. When isoprene is the monomer, 3,4-microstructure most generally results with a smaller amount of 1,2-microstructure in the polymer chain. Naming of the polymer structure which results from 1,2-addition is thus dependent on the monomer being polymerized. For simplicity, the term 1,2-microstructure is employed to describe the microstructure which results from 1,2-addition of conjugated dienes.

The polymerization of 1,3-diene monomer in the aforementioned system is preferably effected adiabatically with an increase in temperature occurring during the course of the reaction. As used in this connection the term adiabatic polymerization means that heat is neither supplied or removed during the course of polymerization.

The temperatures employed are those normally employed in solution polymerization techniques. Thus, any temperature which gives a convenient polymerization rate is usually acceptable. However, since it is necessary to use a greater level of the phosphine oxide modifier to maintain the same level of vinyl content with increasing reaction temperatures, initiation temperatures of between about 0° C. to about 110° C. are preferred. If the operation is to be conducted as a batch operation, initiation temperatures of about 30° C. to 70° C. are preferred. If the operation is to be a continuous operation higher initiation temperatures are employed and it is preferred that the polymerization process be maintained in a range of from 90° C. to 160° C., most preferably 95° C. to 130° C. The polymerization reaction can be performed at pressures between 0.5 to 100 atmospheres. When the desired degree of polymerization has been reached, the (co)polymer can be isolated by precipitation with a non-solvent such as methanol, isopropanol or water. Alternatively, the solution can be injected into the slurry tank containing a hot non-solvent whereupon the solvent is flashed off and the (co)polymer remains as a slurry with the non-solvent. Alternatively, the solvent can be removed directly by the application of heat and/or flashing to a lower pressure.

Although butadiene homopolymers or homopolymers prepared from other 1,3-diene monomers are preferred in the practice of this invention, copolymers containing at least one 1,3-diene monomer can be prepared where the comonomers impart desirable properties and do not detract from the polymer properties. Where such comonomers, as previously discussed, are to be used, generally at least one percent, preferably at least five percent by weight, should be used and as much as sixty percent, preferably no more than forty percent may be used.

The mean average molecular weight of the final (co)polymer produced can range from 1,000 to 500,000. These (co)polymers depending on their molecular weight and composition can be used for a variety of applications ranging from molding materials, rubber goods such as tires, and various adhesive applications.

It is believed that one skilled in the art can, using the preceding description, utilize the present invention to its fullest extent. The following preferred specific embodiments are, therefore, to be construed as merely illustrative of the catalyst system and the polymerization process of the present invention. In all of the following examples, a five percent solution by weight of 1,3-butadiene monomer in hexane is the initial charge in the reactor to control the temperature of the exothermic polymerization reaction.

EXAMPLE 1

A one gallon stainless steel reactor equipped with a stirrer blade is charged with 100 grams of 1,3-butadiene in 2,000 grams of n-hexane. Two millimoles of tripiperidine phosphine oxide, hereinafter TPPO, is added to the mixture and the temperature is adjusted to 115° C. One millimole of n-butyllithium is added to the mixture in the reaction vessel. Polymerization is completed within 30 minutes with the maximum reaction temperature reaching 130° C. After termination of the reaction, 0.5 percent by weight of an antioxidant, di-tert-butyl-p-cresol ("IONOL"), based on the butadiene is added to the mixture which is coagulated in isopropanol and drum dried to remove the solids. The product polybutadiene contains 46.7 percent of 1,2-microstructure as determined by IR spectroscopy.

EXAMPLES 2 to 7

All of the following examples were conducted in accordance with the procedure of Example 1, having an initial charge of 100 grams of 1,3-butadiene monomer in 2,000 grams of n-hexane and employing 1 millimole of n-butyllithium. Only the amount of TPPO is varied with each example.

The reaction conditions of Examples 1 through 7 and the properties of the polymers thus obtained are set forth in Table 1. In Table 1, $T_i$ is the temperature employed at the initiation of polymerization and $T_f$ is the maximum temperature reached during the course of polymerization.

Comparative Example 7 demonstrates that when no TPPO is used in conjunction with the n-butyllithium catalyst, a polybutadiene is produced containing a vinyl group content of only 12.6 percent.

EXAMPLES 8 to 13

All the following examples were conducted in accordance with the procedures of Example 1 having an initial charge of 100 grams of 1,3-butadiene monomer in 2,000 grams of n-hexane, with the exception that tripyrrolidyl phosphine oxide ($TP_yPO$) was used in the place of TPPO. Mean molecular weights of the polymers were determined by gel permeation chromatography (G.P.C.). Reaction conditions and polymer properties for Examples 8 to 13 are set forth in Table 1.

EXAMPLE 14

A one gallon stainless steel reactor equipped with a stirrer blade is charged with 95 grams of 1,3-butadiene and 19 grams of styrene in 2,000 grams of n-hexane. One-half millimoles of TPPO are added and the temperature is adjusted to 100° C. One millimole of n-butyllithium is added to the mixture in the reaction vessel. Polymerization is completed within 30 minutes with the final maximum reaction temperature reaching 130° C. After termination of the reaction, 0.5 percent by weight of an antioxidant, di-tert-butyl-p-cresol ("IONOL"), based on the reaction mixture, is added to the mixture which is coagulated in isopropanol and drum dried to remove the solids. The initial monomer charge underwent a 93 percent conversion to form the product butadiene-styrene copolymer containing 40.9 percent of 1,2-microstructure and 19.4 percent of styrene as determined by IR spectroscopy.

COMPARATIVE EXAMPLE 14A

A butadiene styrene copolymer was produced in accordance with the procedure of Example 14 except no TPPO was used in conjunction with the catalyst charge. The product butadiene-styrene copolymer, represented a 99 percent conversion of monomer, contained 13 percent of 1,2-microstructure and 15.9 percent of styrene as determined by IR spectroscopy.

From the foregoing description, one skilled in the art can easily ascertain the essential characteristics of this invention, and without departing from the spirit and scope thereof, can make various changes and modifications of the invention to adapt it to various usages and conditions.

TABLE 1

| | | Reaction Conditions | | |
|---|---|---|---|---|
| Example | n-Hexane | 1,3-Butadiene Parts by | n-Butyl- | TPPO |

TABLE 1-continued

| ple No. | Parts by Weight | Weight (Grams) | Lithium Millimoles | Millimoles TPPO | Millimoles TPyPO |
|---|---|---|---|---|---|
| 1 | 95 | 5 (100) | 1 | 2.0 | — |
| 2 | 95 | 5 (100) | 1 | 1.0 | — |
| 3 | 95 | 5 (100) | 1 | 0.7 | — |
| 4 | 95 | 5 (100) | 1 | 0.5 | — |
| 5 | 95 | 5 (100) | 1 | 0.4 | — |
| 6 | 95 | 5 (100) | 1 | 0.3 | — |
| 7 | 95 | 5 (100) | 1 | 0.0 | — |
| 8 | 95 | 5 (100) | 1 | — | 0.3 |
| 9 | 95 | 5 (100) | 1 | — | 0.5 |
| 10 | 95 | 5 (100) | 1 | — | 0.5 |
| 11 | 95 | 5 (100) | 1 | — | 0.75 |
| 12 | 95 | 5 (100) | 1 | — | 2.0 |
| 13 | 95 | 5 (100) | 1 | — | 2.0 |

| | Reaction Conditions | | Polymer Properties | | |
|---|---|---|---|---|---|
| Example No. | $T_i$ °C. | $T_f$ °C. | Percent Conversion to Polymer | Percent of 1,2-microstructure | $\overline{M}n$ |
| 1 | 115 | 130 | 80 | 46.7 | 159,000 |
| 2 | 120 | 135 | 92 | 44.6 | 94,700 |
| 3 | 115 | 130 | 82 | 45.0 | 200,000 |
| 4 | 115 | 130 | 90 | 42.9 | 147,000 |
| 5 | 115 | 130 | 95 | 37.5 | 160,000 |
| 6 | 115 | 130 | 95 | 25.6 | 153,000 |
| 7 | 115 | 130 | 100 | 12.6 | 148,000 |
| 8 | 115 | 130 | 92 | 25.5 | 136,100 |
| 9 | 30 | — | 94 | 54.1 | 154,400 |
| 10 | 70 | 95 | 95 | 46.9 | 145,900 |
| 11 | 115 | 130 | 82 | 44.7 | 110,700 |
| 12 | 30 | — | 95.5 | 59.7 | 140,800 |
| 13 | 70 | — | 93 | 57.5 | 124,900 |

We claim:

1. A catalyst system comprising
(a) an anionic initiator based on lithium, and
(b) a phosphine oxide modifier represented by the structural formula:

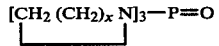

wherein x represents an integer of 3,4 or 5; wherein the molar ratio of (b) to (a) ranges from 0.05/1.0 to 10.0/1.0.

2. The catalyst system of claim 1 wherein the phosphine oxide modifier is selected from the group consisting of tripiperidine phosphine oxide, tripyrrolidyl phosphine oxide and tri(cyclohexamethylene amine) phosphine oxide.

3. The catalyst system of claim 1 wherein the anionic initiator is n-butyllithium.

4. The catalyst system of claim 1 which is free of titanium trihalide.

5. A catalyst system consisting essentially of
(a) an anionic initiator based on lithium, and
(b) a phosphine oxide modifier represented by the structural formula:

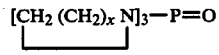

wherein x represents an integer of 3,4 or 5; wherein the molar ratio of (b) to (a) ranges from 0.05/1.0 to 10.0/1.0.

* * * * *